United States Patent [19]
Quick

[11] 3,950,924

[45] Apr. 20, 1976

[54] STICK FEEDING ROLLER FOR SUGAR CANE HARVESTERS

[75] Inventor: Donald Jonathon Quick, Bundaberg, Australia

[73] Assignee: Massey-Ferguson Services N.V., Curacao, Netherlands Antilles

[22] Filed: Oct. 4, 1974

[21] Appl. No.: 512,272

[30] Foreign Application Priority Data

Oct. 13, 1973  United Kingdom............... 47912/73

[52] U.S. Cl.................................. 56/13.9; 56/14.3; 56/503; 198/211
[51] Int. Cl.²......................................... A01D 45/10
[58] Field of Search................... 56/13.9, 14.3, 13.4, 56/503, 13.5–13.8, 14.4; 198/209–212, 82

[56] References Cited
UNITED STATES PATENTS

| | | | |
|---|---|---|---|
| 1,722,395 | 7/1929 | Rabus | 198/212 X |
| 3,342,313 | 9/1967 | Dearsley | 198/211 |
| 3,673,774 | 7/1972 | Mizzi | 56/13.9 |

*Primary Examiner*—Russell R. Kinsey
*Attorney, Agent, or Firm*—Robert L. Farris

[57] ABSTRACT

Roller for feeding wholestick cane from the base cutters towards the can chopping apparatus in a sugar cane harvester. Cane engaging bars are mounted on a central shaft by means of curved leaf springs and accommodate themselves to variations in the thickness of the layer of cane fed, by deflection of the leaf springs.

4 Claims, 6 Drawing Figures

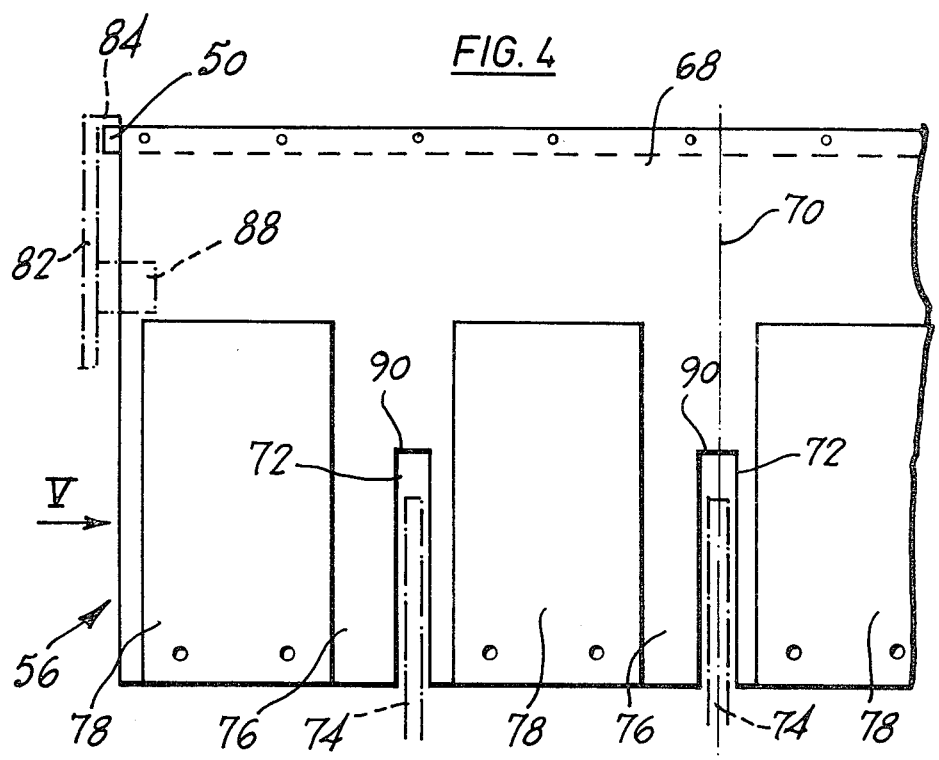
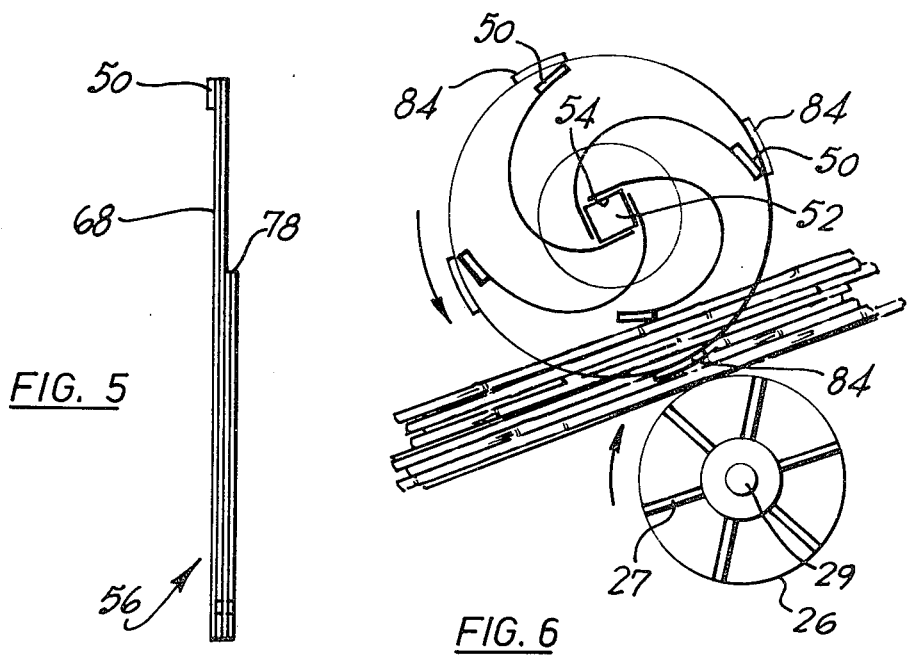

STICK FEEDING ROLLER FOR SUGAR CANE HARVESTERS

This invention relates to sugar cane harvesters and in particular to cane feeding apparatus in such harvesters.

In sugar cane harvesters it is usual practice to provide base cutters to sever the canes from their roots and cane feeding apparatus to convey the severed canes into the harvester to crop handling apparatus and/or crop treatment apparatus such as cane sub-dividing means.

Cane feeding apparatus for this purpose has been proposed in which spaced contra rotating rollers are positioned so that the layer of cane is passed between them and is urged rearwards by them. This arrangement is subject to the disadvantage, however, that the feeding efficiency of the rollers varies when, as is usual during harvesting, the thickness of the layer of cane changes from time to time due, for example, to changes in crop yield from place to place in the harvesting area.

An object of the present invention is to provide improved means for feeding or conveying sugar cane or like elongated articles.

According to the invention there is provided a sugar cane harvester having a cane feed element mounted for rotation, and a drive for said feed element, said drive being capable of transmitting drive to rotate said feed element from a power source on the sugar cane harvester, said feed element comprising:

a support member, said support member being mounted for rotation and being connected to said drive; and cane engaging means, said cane engaging means being mounted on said support member and being rotatable therewith and being capable of engagement with harvested cane during such rotation to feed the cane;

characterized by biasing means, said biasing means acting between the support member and the cane engaging means and being capable of urging said cane engaging means away from the axis of rotation of the feed element.

An embodiment of the invention will now be described by way of example with reference to the accompanying drawings in which:

FIG. 4 shows on a larger scale a developed view of a volute leaf spring forming part of the feed element of FIGS. 2 and 3;

FIG. 5 shows the structure shown in FIG. 4 when viewed in the direction of arrow V in FIG. 4;

FIG. 6 shows, on a larger scale, a portion of FIG. 1.

Figure 1:
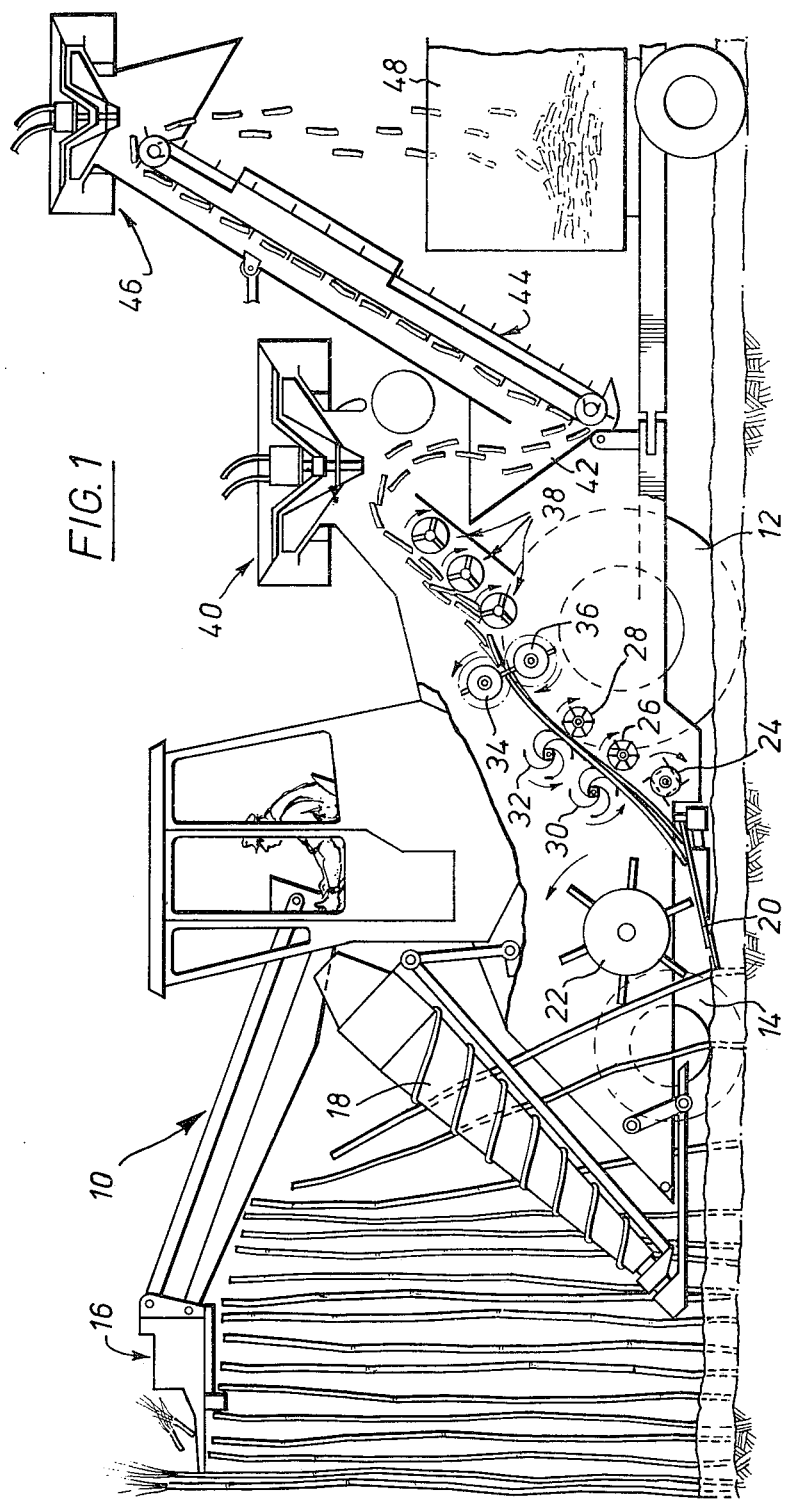
FIG. 1 shows a sugar cane harvester in side elevation and partly cut away to reveal its crop handling apparatus.
Figure 2:
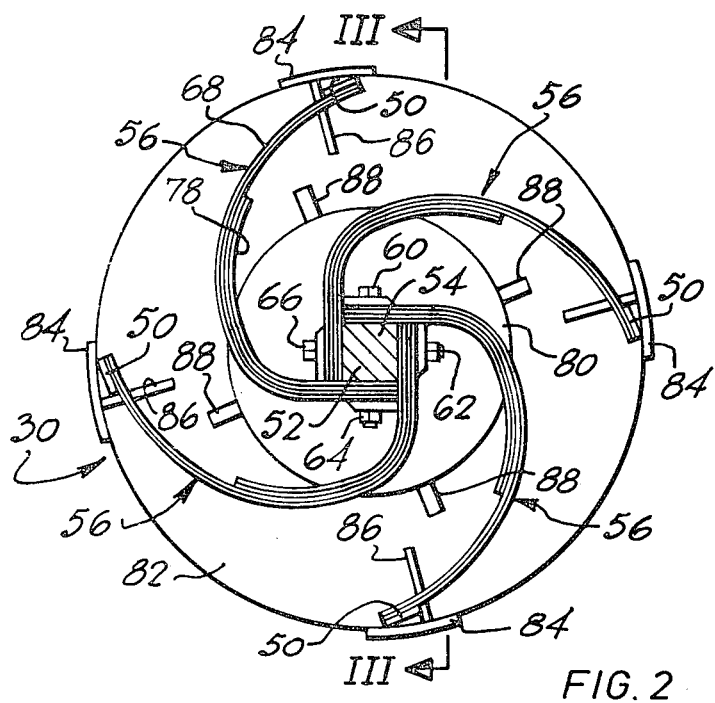
FIG. 2 shows, on an enlarged scale, a rotatable feed element of the cane harvester of FIG. 1 viewed in end elevation as in FIG. 1.
Figure 3:
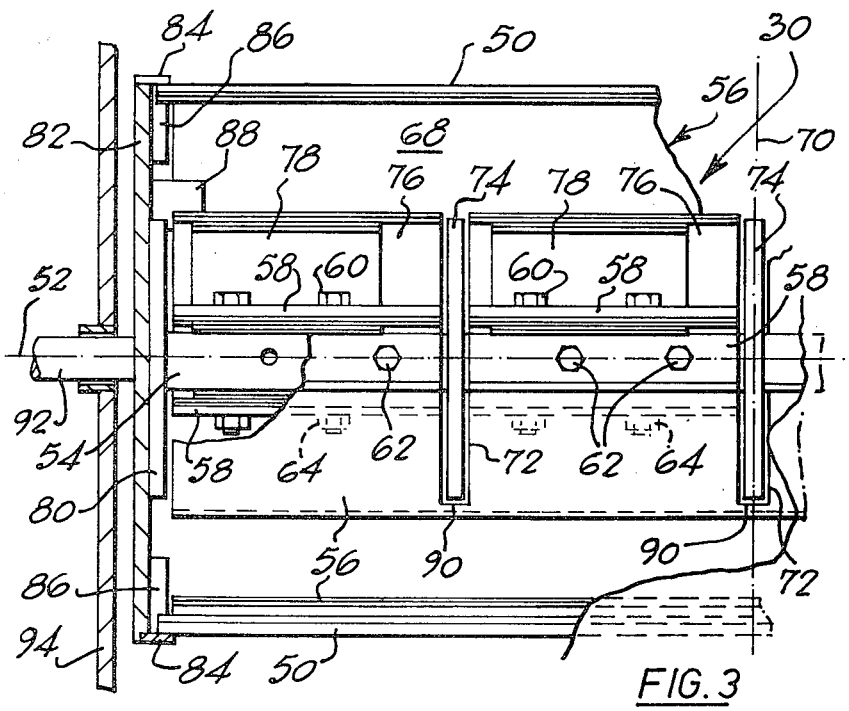
FIG. 3 shows a section on the line III—III in FIG. 2.

Referring to FIG. 1, a sugar cane harvester 10 comprises rear traction wheels 12, forward steerable wheels 14, a top cutting unit 16, and rotatable crop lifters 18.

Twin contra-rotating base cutters 20 sever the canes from their roots and they are fed rearwards by cane feeding apparatus, including large paddle roller 22, butt lifter roller 24, feeding and cleaning rollers 26, 28 and drivably rotatable roller-like feed elements 30, 32 which co-operate with the rollers 26, 28 respectively.

The cane emerging from between rollers 28, 32 is chopped into 1 foot lengths by cane subdividing means in the form of chopper drums 34, 36. The cane pieces cascade over flipper rollers 38, trash is removed by first trash removal apparatus 40, the cane pieces are collected in a hopper 42 and then passed by an elevator 44 through second trash removal apparatus 46 before dropping into a trailer 48.

Feed rollers 26 and 28 each comprise a series of radial paddles 27 mounted on a central shaft 29 (FIG. 6) and the rollers are mounted in fixed positions on the harvester body, and driven in the directions indicated in FIG. 1 by the engine (not shown) of the harvester.

The structure of feed element 30 is the same as that of feed element 32.

Feed element 30 comprises cane engaging means in the form of four axially extending feed members 50 mounted for engagement with the harvested cane to effect feeding thereof when the feed element is rotated. Feed members 50 are mounted on the feed element so as to be movable towards and away from the axis of rotation 52 thereof.

Each feed member 50 is mounted on a support member in the form of a square section central shaft 54 by biasing means in the form of a volute leaf spring 56.

Feed members 50 are in the form of metal bars riveted to the outer ends of leaf springs 56. The inner ends of the four leaf springs are clamped to shaft 54 by plates 58 on opposite sides of the shaft and two offset series 60, 62 of bolts and associated nuts 64, 66 respectively.

As shown on FIGS. 4 and 5, each leaf spring 56 comprises a two leaf full width rectangular portion 68 extending axially from the centre line 70 of the feed element to each end of the feed element. This portion constitutes a blanking plate to prevent the passage of sugar canes between shaft 54 and feed member 50.

Three equally spaced slots 72 are formed in each leaf spring 68 to receive three discs 74, which are fixed to shaft 54.

The four inner portions 76 between the slots 72 in each spring 68 are each strengthened by a rectangular two-leaf spring 78.

Two further discs 80, similar to the discs 74 are fixed to shaft 54, one at each end thereof. A circular end plate 82 is fixed to each disc 80 on the axially outer side thereof.

Four curved ledges 84 are fixed to the outer periphery of end plate 82 at equally spaced positions and constitute abutments engageable with the ends of feed members 50 to limit outward movement thereof. Each ledge 84 is supported by a radial flange 86 welded to end plate 82.

To limit inward movement of the feed members 50 four equally spaced stops 88 are welded to each end plate 82 for engagement with the ends of leaf springs 56. Additionally, the ends 90 of the slots 72 in the leaf springs constitute stops engageable with the three discs 74 for the same purpose.

Feed element 30 has end shafts 92 extending from square shaft 54, journalled in bearings (not shown) supported by the body 94 of the harvester, and connected to a drive (not shown) for rotating the feed element. The drive may comprise chain and/or belt drives from a diesel engine or other power source (not shown) on the harvester. Such a drive is purely conventional and is therefore not illustrated.

In use, feed elements 30 and 32 co-operate with feed rollers 26, 28 to feed the cane to chopper drums 34, 36. Feed members 50 accommodate themselves to the thickness of the layer 96 (see FIG. 6) of cane being fed. The inner and outer positions of the feed members 50 as determined by abutments 84 and stops 88 correspond to the maximum and minimum thickness of the cane layer normally encountered in use.

Advantages of the embodiment of the invention described above include the following:

1. the feed elements produce a more constant rate of cane feed to the cane choppers 34, 36 with the result that the length of the pieces of chopped cane is more constant;
2. the axis of rotation of each feed element is fixed therefore the drive train thereto is of simple construction;
3. movement of the feed members 50 inwards and outwards is achieved without the use of hinges or sliding components and the working life of the unit is therefore longer and the requirement for maintenance is reduced.

Among modifications which may be made to the above embodiment and which fall within the scope of the invention are the use of less than four or more than four feed members, different shapes and arrangements of leaf springs and indeed the use of other arrangements in which a rotatable feed element can be resiliently deformed so as to change its effective radius to accommodate differing thicknesses of cane layer.

I claim:

1. A sugar cane harvester having a cane feed element mounted for rotation, and a drive for said feed element, said drive being capable of transmitting drive to rotate said feed element from a power source on the sugar cane harvester, said feed element comprising:
   a support member including a central shaft mounted for rotation and being connected to said drive;
   cane engaging means including at least three feed members extending axially with respect to the feed element mounted on said support member and being rotatable therewith and being capable of engagement with harvested cane during such rotation to feed the cane;
   biasing means including leaf springs acting between the support member and the cane engaging means and being capable of urging said cane engaging means away from the axis of rotation of the feed element; and a blanking plate mounted between the central shaft and each feed member to prevent the passage of sugar cane sticks therebetween.

2. A sugar cane harvester according to claim 1 characterized in that each blanking plate is itself also formed as a leaf spring.

3. A sugar cane harvester having a cane feed element mounted for rotation, and a drive for said feed element, said drive being capable of transmitting drive to rotate said feed element from a power source on the sugar cane harvester, said feed element comprising:
   a support member including a central shaft mounted for rotation and being connected to said drive;
   cane engaging means including at least three feed members extending axially with respect to the feed element mounted on said support member and being rotatable therewith and being capable of engagement with harvested cane during such rotation to feed the cane;
   biasing means acting between the support member and the cane engaging means and being capable of urging said cane engaging means away from the axis of rotation of the feed element; and stop means to limit movement of the feed members toward the axis of rotation of the feed element, said stop means including at least one disc mounted on the shaft.

4. The sugar cane harvester of claim 3 including abutment means mounted on the support member for limiting movement of the feed members away from the axis of rotation of the feed element.

* * * * *